UNITED STATES PATENT OFFICE.

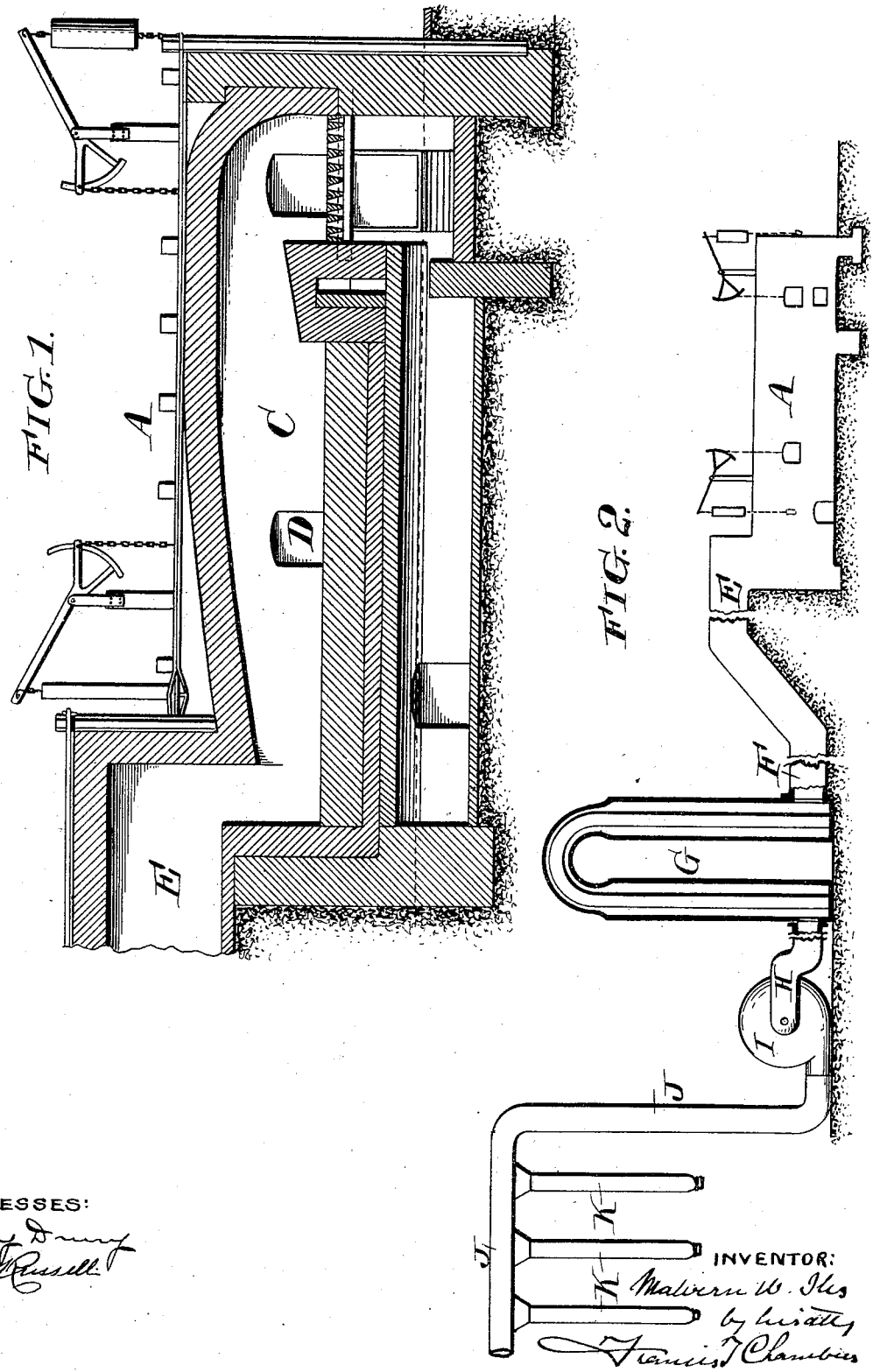

MALVERN W. ILES, OF DENVER, COLORADO.

PROCESS OF TREATING FLUE-DUST.

SPECIFICATION forming part of Letters Patent No. 500,580, dated July 4, 1893.

Application filed July 20, 1892. Serial No. 440,586. (No model.)

*To all whom it may concern:*

Be it known that I, MALVERN W. ILES, of Denver, county of Arapahoe, State of Colorado, have invented a certain new and useful Improved Process for Treating Flue-Dust, of which the following is a true and exact description, reference being had to the accompanying drawings, which form a part of this specification.

In the smelting of lead ores there is driven off from the furnace in addition to the gases, carbonaceous material in the form of smoke, and metallic fumes, quite a large quantity of finely divided particles made up of the different ingredients of the furnace charge, and which is carried out of the furnace with little or no alteration. These particles settle in the dust chambers and flues connected with the furnace while the smoke, metallic fumes, &c., are carried on, either to a stack or a bag house where the solid constituents, metallic fumes and carbon are strained out from the gases and saved.

My invention relates to the particles of ore deposited in the dust chambers and those portions of the flues nearest to the furnace which is known as flue dust and my object is to so treat this flue dust as to practically save all of the metal contained in it. Many different treatments have heretofore been proposed and adapted for the treatment of such flue dust; it has been mixed with clay or clay ores and the mixture charged into a smelting furnace either wet or dry; it has been mixed with lime and then charged into the smelting furnace; it has been compressed into bricks by the use of heavy pressure, and generally with the addition of some binding material and then re-charged into the furnace; it has been mixed with water and the mud charged into the furnace, and it has been fused in connection with various ores while undergoing what is known as the roasting treatment. This and other treatments to which the flue dust has been subjected, have all well recognized faults and it is well known that a very considerable loss of lead and other valuable substances takes place in the treatment of dust. In the various treatments of the dust by which it is fused and at the same time subjected to a roasting operation in connection with the other ores the loss is particularly in lead fume, this fume being so largely mixed with sulphuric and sulphurous acid that it has heretofore been found to be impracticable to save it by screening.

I have discovered that by charging the flue dust into a fusion furnace and fusing it rapidly, which is not difficult, because it contains some of all the ingredients of the furnace charge, and will therefore form a slag readily and quickly, a lead fume is driven off containing so small a proportion of sulphuric or sulphurous acid and so little moisture that it can be caught in fabric screens or bags, and my process consists in charging the flue dust into a fusion furnace, fusing it rapidly and screening the products driven off from the furnace to save the metallic fumes, and running the fused dust into receptacles where it can cool and harden. The fume may be carried from the fusion furnace to the bag room connected with the smelters, but as the fume driven off from the fusion furnace contains practically no carbon, and will not ignite to form a cinder as is the case with the fume from the smelters, it is advisable to use an independent screen system for the fusion furnace. The white fume collected therein can be used either as the basis for a pigment, charged back into the fusion furnace with flue dust, or charged directly into the smelter.

In the drawings I have illustrated such apparatus as is adapted for use with any process.

Figure 1 shows a fusion furnace in longitudinal section, and Fig. 2 shows such furnace in connection with cooling flues and a screen system.

A is the fusion furnace of which C is the working chamber. The flue dust is charged into the furnace, as through side openings D, and the fume and smoke escape through flue E, thence passing through cooling flues F, G, H to a fan I which forces them through conduit J to a series of fabric bags K in which the fume is retained while the gaseous products of the furnace escape through the fabric.

Having now described my invention, what

I claim as new, and desire to secure by Letters Patent, is—

The method of treating flue dust collected from lead smelting furnaces which consists in charging said dust into a fusion furnace, subjecting it to quick fusion therein, collecting the lead fume in screens connected with the furnace and running the fused dust into receptacles wherein it can cool.

MALVERN W. ILES.

Witnesses:
 JOHN S. WILLIAMS,
 CLARENCE T. DYE.